April 28, 1964     S. B. SCHULMAN     3,130,581
TORQUE AND SPEED MEASURING INSTRUMENT
Filed Feb. 4, 1957     2 Sheets-Sheet 1
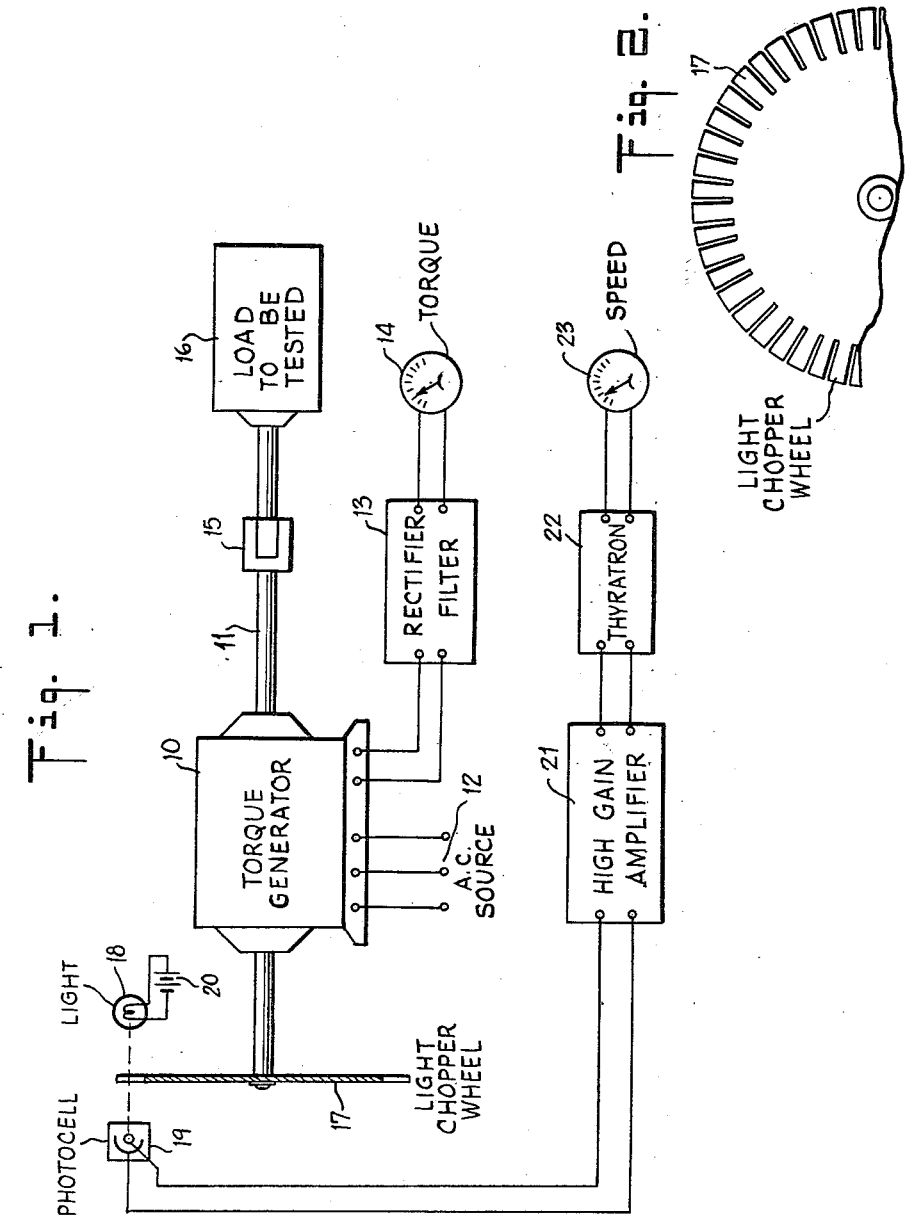
INVENTOR.
SIDNEY B. SCHULMAN
BY
ATTORNEYS

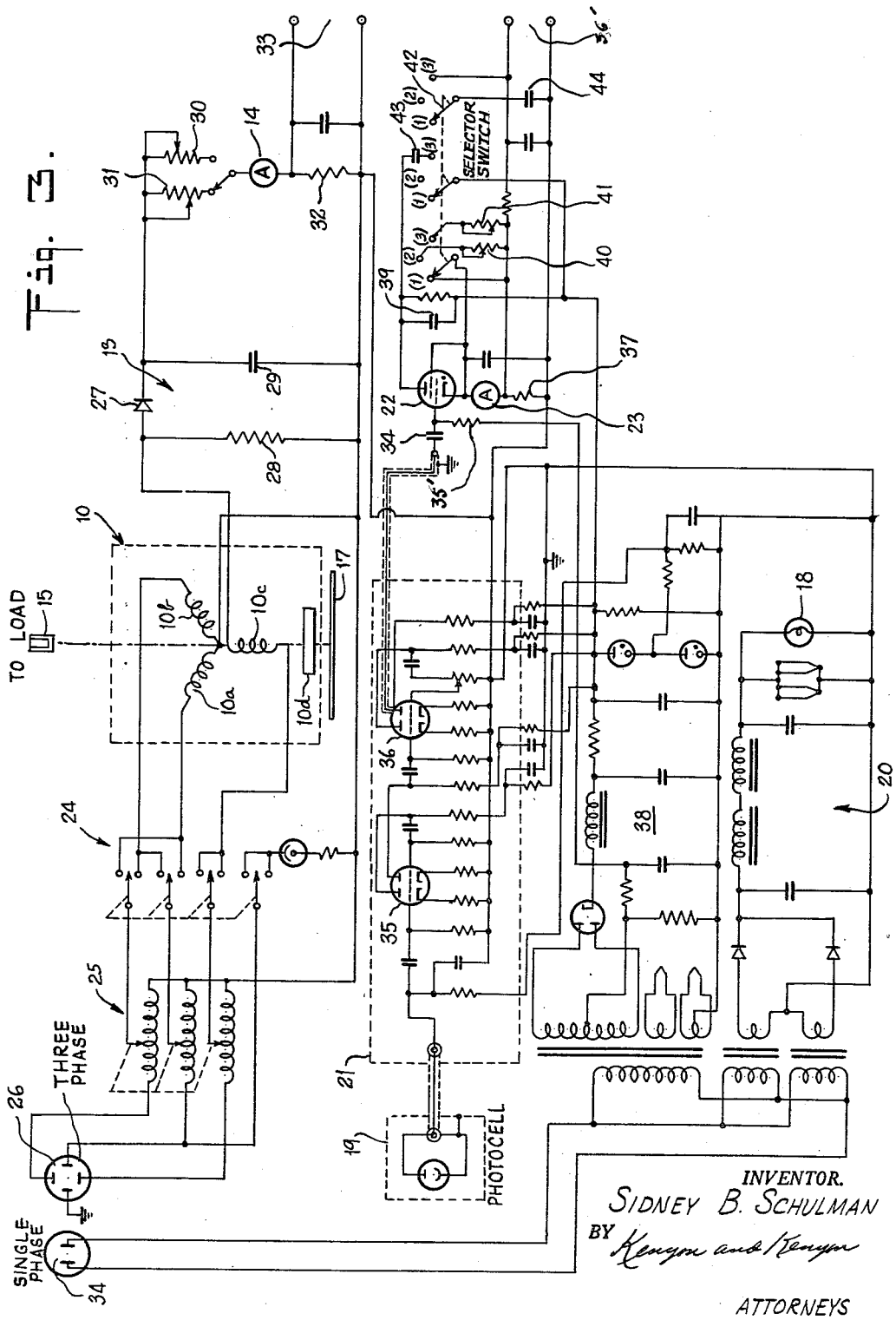

United States Patent Office 3,130,581
Patented Apr. 28, 1964

3,130,581
TORQUE AND SPEED MEASURING INSTRUMENT
Sidney B. Schulman, Little Neck, N.Y., assignor to Bulova Research and Development Laboratories, Inc., Woodside, N.Y., a corporation of New York
Filed Feb. 4, 1957, Ser. No. 638,066
3 Claims. (Cl. 73—136)

The present invention relates generally to the measurement of rotary forces and more particularly to an apparatus adapted simultaneously to provide torque and speed measurements.

Torque is a measure of the tendency in a body to rotate and may be regarded as the twisting power exerted on an object. It is the principal object of the present invention to provide a direct-reading instrument which affords simultaneous indications of the torque and speed of a torque-producing source under test. An important feature of an instrument in accordance with the invention resides in the fact that the system may be operated in either direction of rotation and is capable of supplying a calibrated constant torque or of accepting an applied external torque which it will read directly.

Also an object of the invention is to provide a combination torque and speed indicating instrument of simple, efficient and reliable design which may be constructed at relatively low cost. A further advantage of the invention is that multi-range operation is possible in both torque and speed, and selection of the desired ranges is readily accomplished.

Briefly stated, an instrument in accordance with the invention includes a torque generator constituted by an electric motor having a stator winding connected to an electrical source, the shaft of the motor being mechanically coupled to a load to be tested. The shaft is also coupled to a light chopper disposed in the path of a light beam which is intercepted by a photo-sensitive detector to produce electrical pulses at a rate depending on the speed of the shaft. By measuring the repetition rate of the pulses and the intensity of current flow through thte stator winding, the speed of the motor and the torque may be simultaneously read.

For a better understanding of the invention as well as other objects and further features thereof, reference is had to the following detailed description to be read in conjunction with the accompanying drawing, wherein like components in the various views are identified by like reference numerals.

In the drawings:

FIG. 1 is a block diagram of a torque and speed-measuring instrument in accordance with the invention.

FIG. 2 is a detail of an element shown in FIG. 1.

FIG. 3 is a schematic circuit diagram of the instrument.

Referring now to the drawing and more particularly to FIG. 1, the direct-reading torque and speed-measuring instrument comprises a torque generator 10 in the form of an electric motor having an armature shaft 11, the stator windings being connected to an alternating-current source 12. The alternating-current drawn by the motor is a function of the torque and after rectification and filtering in a circuit 13 is indicated by a suitable direct-current ammeter 14.

One end of shaft 11 is mechanically coupled by a suitable coupler or chuck 15 to a load 16 to be tested. Attached to the other end of the shaft 11 is a light chopper wheel in the form of a balanced disc 17. Disc 17, as shown separately in FIG. 2, is provided with 360 radial slots cut at one degree intervals. The light chopper system has no appreciable effect on the torque-measuring system.

The chopper disc is interposed between an electric lamp 18 and a photocell 19, the light beam from the lamp being interrupted once each degree. The lamp 18 is energized from a direct-current source 20 to produce a beam of light of unvarying intensity. The photocell 19, which senses the interrupted light beam, produces electrical pulses at a rate of 360 per full revolution of the shaft, the repetition rate per minute being in accordance with the rotary speed of the shaft.

The output voltage of the photo-pick-up 19 is fed to a high-gain low-noise amplifier 21. The amplifier is driven to saturation and cut-off so that its output is a constant amplitude square wave. This square wave is differentiated and then applied to a gaseous thyratron 22. The average cathode current thyratron 22 is an indication of r.p.m., the circuit parameters being chosen to make this current proportional to frequency. A direct-current meter 23 in the thyratron circuit affords a direct reading of motor speed. Thus the instrument which includes meters 14 and 23 provides simultaneous readings of torque and speed.

Referring now to the details of the circuit shown in FIG. 3, the torque generator 10 is constituted by a three phase motor including three stator windings 10a, 10b and 10c. The rotor 10d, which is mounted on the motor shaft 11, preferably takes the form of a solid ferromagnetic shell mounted on low friction bearings whereby no perceptible variation in the torque occurs during a full 360° of displacement. The use of a three phase system which sets up a constant rotating field, together with the solid rotor assures a non-pulsating torque output which remains constant within the speed range of the instrument and is independent of the angular position of the shaft.

The stator windings 10a, 10b and 10c are connected through a direction-reversing switch 24 and a variable inductance type of voltage control 25 to a three phase alernating-current source terminals 26. Thus the torque, developed by the generator 10, may be controlled by manipulating the variable inductor 25, whereas the direction of rotation may be selected by switch 24 which is arranged to change the relative phases of current in windings 10a, 10b and 10c.

The stator current developed in each of the three windings is proportional to the output torque. This current is rectified in circuit 13 by means of diode 27 and filtered by means of resistor 28 and capacitor 29, the direct current being fed through the D.-C. millimeter 14. Range-control variable resistors 30 and 31 are selectively connected in series witth the millimeter 14. Thus ranges in order for example of 0 to 4 and 0 to 40 ounce-inches may be had.

Because of the relationship existing between current and torque, a substantially logarithmic scale calibrated in ounce-inches is provided. For recording purposes, the voltages developed across a resistance 32 in series with the direct reading meter 14 is connected to recording terminals 33 for direct coupling to a commercial recording device.

The speed indicating circuit includes a lamp 18 energized by a direct current source 20 in the form of a rectifier and filter circuit coupled to single phase alternating-current terminals 34. Light from lamp 18, as pointed out in FIG. 1, is directed through a chopper 17 mounted on the motor and intercepted by a photocell 19 whose output is fed to an amplifier 21. Amplifier 21 includes vacuum tubes 35 and 36 which are driven to saturation and cut-off so that the amplified pulses derived from the photocell 19 are of constant amplitude.

The output of amplifier 21 is connected through a differentiating circuit including condenser 34 and resistor 35' to the ignition circuit of the thyratron 22 whose cathode circuit includes the current meter 23. To supply voltage to an external recording device, the terminals 36' are connected to a resistor 37 in series with meter 23. A high voltage for the thyratron 22 as well as for the anodes of the amplifier tubes is supplied by a power supply 38.

Included in the anode circuit of the thyratron is an R-C network 39 which maintains a cut-off or extinction potential thereon for a predetermined interval. The firing of the thyratron is controlled at a rate determined by the periodicity of the pulses applied to the ignition circuit from the amplifier 21. The average current through the thyratron is proportional to the pulse rate and hence affords an indication of the r.p.m. of the motor. The meter range is controlled selectively through resistors 40 and 41.

To control the range of the speed measuring circuit, a selector switch 42 is provided having three positions, 1, 2 and 3. At position 1, the meter circuit is shorted out and thereby rendered inactive. At position 2 the resistor 40 is shunted across the meter and at position 3 the resistor 41 is shunted thereacross to provide different ranges, say from 0 to 100 r.p.m. to 0 to 10 r.p.m. At position 3, a condenser 43 is shunted across the R-C circuit 39 to alter the range appropriately and a condenser 44 is shunted across the resistor 37 in the external recorder system for the same reason.

For speeds in excess of the range limits of the system, the switch 42 may be put in the off or 1 position and the speeds observed by stroboscopic means directed on the slotted light-chopper wheel 17.

For optimum results, the torque phasing circuit should be balanced within ½ volt. An unbalance will affect calibration mainly on the low torque range, but a steady unbalanced condition may be compensated for by proper calibration. The torque generated in the torque motor may be varied by manipulation of the variable inductor 25. At the start of a test, this control should be set to its minimum position to prevent "run-away."

As an example of the operation of the instrument as a calibrated torque source, let us assume that it is required to check the function of a gear box at 70 r.p.m. To this end the shaft of the gear box is coupled to the shaft 11 of the torque motor by means of chuck 15. The gear box shaft axis should be aligned so that it is true with the center line of the chuck.

The r.p.m. range is first set to 10 r.p.m. (position 3), the variable inductor 25 being set initially for zero torque, and the torque range switch is placed at 40 ounce-inches by means of resistor 30. The drive direction switch 24 is set in either direction, i.e., clockwise or counterclockwise, as desired. Break-away torque will be indicated at that point where the speed meter 23 begins to indicate.

The r.p.m. range can now be set to 100 r.p.m. (position 2) and the torque control 25 is advanced until 70 r.p.m. is reached, the torque at this speed being indicated by meter 14.

To test a motor, a dynamometer procedure is used similar to that described hereinabove except that the direction at which the torque generator 10 is set is such as to oppose the direction at which the motor under test revolves. Speed versus torque data can be then taken up to stall torque, provided of course the maximum speed and torque are within the rated limits of the instrument.

While there has been shown what is considered to be a preferred embodiment of the invention, it will be manifest that many changes and modifications may be made therein without departing from the essential spirit of the invention. It is intended, therefore, in the annexed claims to cover all such changes and modifications as fall within the true scope of the invention.

What is claimed is:

1. Apparatus for simultaneously indicating torque and speed comprising a torque generator constituted by a three phase electric motor having three stator windings and a rotor mounted on a double ended shaft extending from both ends of said motor, said windings being connected to a three-phase power source having voltage adjusting means whereby said shaft rotates in accordance with the power supplied by said source, means mechanically to couple one end of said shaft to a load to be tested, rectifier and filter means responsive to the alternating current drawn by said windings to produce a direct current as a function of motor torque, a direct-current meter to read said direct current to provide a torque indication, a light chopper disc mounted on the other end of said shaft and including radial slots at one degree intervals thereon, a light source arranged to project light through said slots, a photo detector to intercept said light projected through said disc, means coupled to said detector and responsive to the repetition rate of the pulses produced therein to produce a direct current whose intensity is in accordance with said rate, and a direct current meter responsive to said direct current to produce a speed indication.

2. Apparatus for simultaneously indicating torque and speed comprising a torque generator constituted by a three-phase electric motor having three stator windings and a rotor mounted on a double-ended shaft extending from both ends of said motor, said windings being connected to a three-phase power source having voltage adjusting means whereby said shaft rotates in accordance with the power supplied by said source, chuck means mechanically to couple one end of said shaft to a load to be tested, a rectifier and filter circuit interposed between said power source and said windings and responsive to the alternating current drawn by said windings to produce a direct current as a function of motor torque, a direct-current meter coupled to said circuit to read said direct current thereby to provide a torque indication, a light-chopper disc mounted on the other end of said shaft and including radial slots formed at one degree intervals thereon, a constant light source arranged to project light through said slots, a photo detector disposed to intercept said light projected through said disc, means coupled to said detector and responsive to the repetition rate of the pulses produced therein to produce a direct current whose intensity is in accordance with said rate, and a direct current meter responsive to said direct current to produce a speed indication.

3. Apparatus as set forth in claim 2 wherein said rotor is constituted by a solid ferro-magnetic shell disposed within said stator windings to assure a non-pulsating torque.

References Cited in the file of this patent

UNITED STATES PATENTS

| | | |
|---|---|---|
| 2,542,659 | Gillett | Feb. 20, 1951 |
| 2,586,540 | Holden | Feb. 19, 1952 |
| 2,708,361 | Boyle et al. | May 7, 1955 |
| 2,760,366 | Farmer | Aug. 28, 1956 |
| 2,947,168 | Yang | Aug. 2, 1960 |

FOREIGN PATENTS

| | | |
|---|---|---|
| 417,051 | Great Britain | Sept. 21, 1934 |